United States Patent Office 3,686,009
Patented Aug. 22, 1972

3,686,009
QUINACRIDONE CONTAINING PIGMENTS
William A. West, Newark, Del., assignor to E. I. du Pont de Nemours and Company, Wilmington, Del.
No Drawing. Continuation of application Ser. No. 813,748, Apr. 4, 1969. This application Mar. 3, 1971, Ser. No. 120,765
Int. Cl. C08h *17/14*
U.S. Cl. 106—288 Q            2 Claims

ABSTRACT OF THE DISCLOSURE

As new quinacridone based pigments, solid solutions of, by weight, 5 to 67 percent of linear quinacridone, 30 to 85 percent of quinacridonequinone, and 3 to 20 percent of 6,13-dihydroquinacridone.

This application is a continuation of applicant's U.S. application Ser. No. 813,748, filed Apr. 4, 1969, and now abandoned.

BACKGROUND

The quinacridones include well known and widely used organic pigments such as unsubstituted and substituted linear quinacridones, and solid solutions of linear quinacridones and quinacridone derivatives. Such solid solution pigment compositions and their preparation are described, for example, in U.S. Patents 3,160,510 and 3,298,847, among others.

SUMMARY OF THE INVENTION

By the present discovery there is provided new pigment compositions composed, by weight, of 3 to 20 percent of 6,13-dihydroquinacridone, 5 to 67 percent of a quinacridone and 30 to 85 percent of quinacridonequinone, with at least the quinacridone and quinacridonequinone being present in solid solution. These pigments exhibit an extremely attractive color which may be gold or maroon. When enamels prepared from pigments of these components are drawn down on metal panels and exposed to sunlight and weathering, the pigments are found to be extremely lightfast, and definitely superior in this property to other conventional, commercially available quinacridone pigments.

Each of the components used in the new pigments is well known. The quinacridone employed has the following structural formula

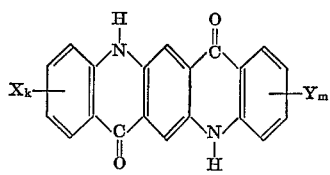

where X and Y are radicals selected from the group consisting of F, Cl, Br, alkyl having 1 to 4 carbon atoms, and alkoxy having 1 to 4 carbon atoms, or combinations thereof, and where $k$ and $m$ are integers from 0 to 2 inclusive. In the preferred compositions, unsubstituted linear quinacridone is used. As is known, quinacridonequinone and 6,13-dihydroquinacridone are available in substituted form corresponding to the quinacridones of the above structural formula. However, the unsubstituted forms are preferred for purposes of the present discovery.

As noted, pigment compositions of this invention are characterized by having at least the quinacridone (QA) and quinacridonequinone (QAQ) present as a solid solution. Preferably, the 6,13-dihydroquinacridone (DQA) also is present as a component of the solid solution; however, the DQA also can be present as a component of the pigment simply in admixture with the solid solution of the other two components, or a portion of the DQA can be a component of the solid solution and a portion in admixture with the solid solution. Regardless of which of the three conditions exists for the DAQ, the percentage required for the improved lightfastness characteristics exhibited by these novel pigments is from about 3 to about 20 percent by weight based on the total pigment composition.

The method of preparing the pigments of this invention can be any of the procedures described in the prior art for the formation of solid solutions of quinacridones. The method of U.S. 3,160,510 given in its examples has been found to be completely satisfactory. Other methods of preparation of solid solutions are described in U.S. 3,298,847 (Hanke to Du Pont) and in U.S. 3,287,147 (Wilkinson to Imperial Chemical Industries) and the disclosures of any of these patents are applicable to the preparation of the solid solutions of this invention.

The invention will be described further in the following examples, in which the detail is given by way of illustration and not by way of limitation.

Example 1

(a) In order to prepare the solid solution composition, 75 parts by weight of quinacridonequinone and 25 parts of linear quinacridone (unsubstituted) are dusted into 700 parts of 96% $H_2SO_4$ while the temperature is held below 35° C. While maintaining the temperature at 35°±2° stirring is continued for 1 hour. This sulfuric acid solution is drowned by forcing the solution under pressure through a nozzle into 3500 parts of water at 20° C. while maintaining the water in a highly turbulent state. The resulting aqueous slurry is stirred and heated to 90° C., and held at this temperature for 2 hours. The slurry is then filtered and washed free of sulfate ions.

(b) The foregoing procedure is repeated with the exception that 75 parts of quinacridonequinone, 25 parts of quinacridone, and 16 parts of 6,13-dihydroquinacridone are added to 812 parts of 96% $H_2SO_4$. The same procedure as given in Example 1 is continued through the washing of the pigment produced.

The pigments prepared as in (a) and (b) are texture-treated by a well-known and widely-practiced technique: the wet precipitation of calcium rosinate on the pigments. In these examples, the amount of calcium rosinate used is 10% based on the pigment weight. The pigment is dried at about 60° C. and thereafter is pulverized in a hammer mill.

A portion of each of these pigments is incorporated into a thermosetting acrylic enamel. Sprayed panels are prepared using the pigments in combination with both flake aluminum for metallic effect and with white extender for tint. In each case the pigment sample is extended by the use of 50% aluminum flake or by 95% titanium dioxide.

Panels prepared using enamel comprising the pigment of Example 1(b) are compared with control panels prepared in a similar manner using pigment of Example 1(a). The panels are exposed in Florida for 6 months with a 5° south exposure and are graded for change in color using an arbitrary scale of units from 0 through 10, 0 indicating complete failure and 10 indicating perfect stability of color. The panel prepared from pigment of only quinacridone and quinacridonequinone, 1(a), is rated 6, while the panel using the experimental pigment, 1(b), is rated 9.

Examples 2 and 3

Using the same procedure as given in Example 1, pigments are prepared of quinacridone (QA) quinacridonequinone (QAQ), and (except in the control samples) 6, 13-dihydroquinacridone (DQA). These pigments are prepared using the following amounts of the components:

TABLE I

| Example | Parts by weight used acid pasting | | | Light-fast rating of pigment product | Color of pigment |
|---|---|---|---|---|---|
| | QA | QAQ | DQA | | |
| 2(a) (Control) | 20 | 80 | 0 | 5 | Gold. |
| 2(b) | 17 | 67 | 15 | 9 | Do. |
| 2(c) | 5 | 85 | 10 | 8 | Yellow-gold. |
| 3(a) (Control) | 60 | 40 | 0 | 8.0 | Maroon. |
| 3(b) | 58 | 39 | 3 | 9 | Do. |

From the results shown in Table I, it is evident that the three component pigments of this invention, i.e. Examples 2(b), 2(c) and 3(b), are far superior in lightfastness to the two-component controls of Examples 1(a), 2(a), and 3(a).

While the invention has been described with certain detail, it will be apparent that changes can be made without departing from its scope.

I claim:

1. A pigment consisting essentially of (a) 5 to 67 percent of linear quinacridone of the structural formula

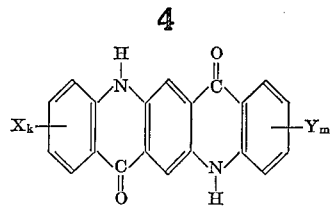

where X and Y are radicals selected from the group consisting of F, Cl, Br, alkyl having 1 to 4 carbon atoms and alkoxy having 1 to 4 carbon atoms, or combinations thereof, and where $k$ and $m$ are integers from 0–2 inclusive, (b) 3 to 20 percent of 6,13-dihydroquinacridone, and (c) 30 to 85 percent of quinacridonequinone, at least said quinacridone and quinacridonequinone being present in solid solution.

2. The pigment of claim 1 in which said solid solution includes at least a portion of the 6,13 - dihydroquinacridone.

References Cited

UNITED STATES PATENTS 3,160,510 4/1960 Ehrich _____ 106—288 Q
3,298,847 1/1967 Hanke et al. _____ 106—288

TOBIAS E. LEVOW, Primary Examiner

J. V. HOWARD, Assistant Examiner